Figure 1:
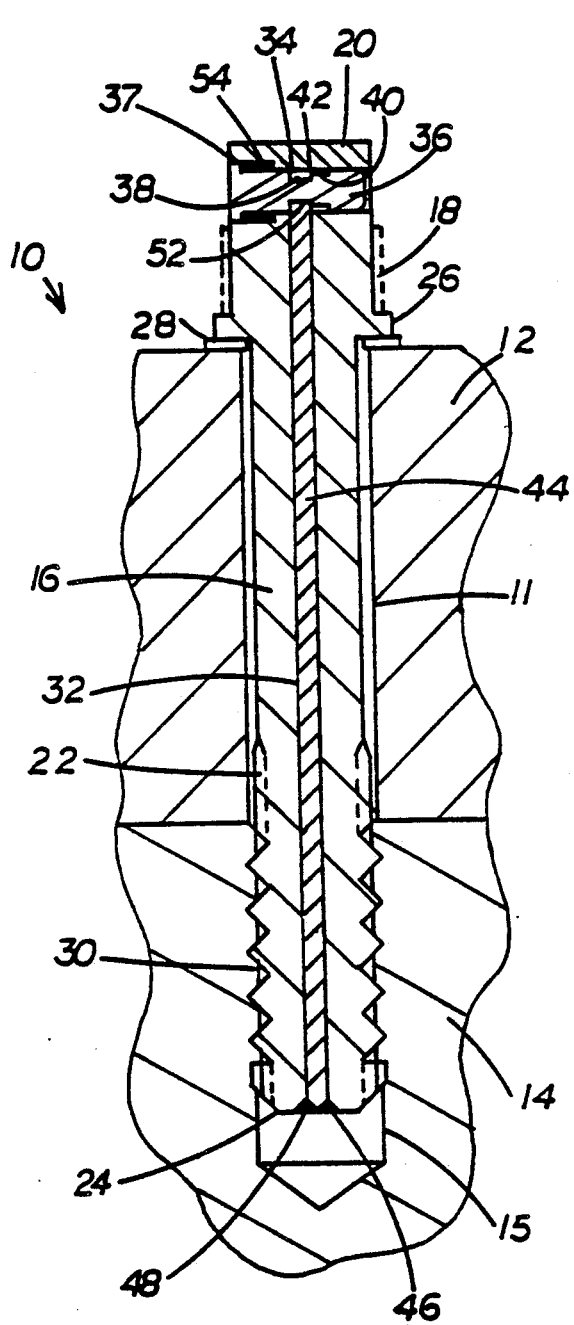

United States Patent [19]
Stanage

[11] Patent Number: 5,102,273
[45] Date of Patent: Apr. 7, 1992

[54] VISUALLY INDICATED PRELOADED BOLT

[75] Inventor: Nickie L. Stanage, Cassopolis, Mich.

[73] Assignee: Allied-Signal Inc., Morristown, N.J.

[21] Appl. No.: 660,764

[22] Filed: Feb. 25, 1991

[51] Int. Cl.$^5$ .................. F16B 31/02; G01L 5/00
[52] U.S. Cl. ....................... 411/14; 411/916; 73/761; 116/212; 116/DIG. 34
[58] Field of Search ............ 411/8, 9, 13, 14, 916; 73/761; 116/212, DIG. 34

[56] References Cited

U.S. PATENT DOCUMENTS

| 3,589,234 | 6/1971 | Trigg | 411/9 |
| 3,908,508 | 9/1975 | Payne | 411/14 |
| 4,041,776 | 8/1977 | Payne | 116/DIG. 34 |

FOREIGN PATENT DOCUMENTS 536340  12/1976  U.S.S.R. .................. 411/14

Primary Examiner—Neill R. Wilson
Attorney, Agent, or Firm—Leo H. McCormick, Jr.; Larry J. Palguta; Robert A. Walsh

[57] ABSTRACT

A bolt for attaching a first member to a second with a desired compressive force. The bolt has a cylindrical body with a threaded section on a first end and a head on a second end. The cylindrical body had a longitudinal bore which extends to a cross bore in the head. A pin located in the cross bore has a first flat surface separated from as second flat surface by a shoulder. A rod located in the longitudinal bore has a first end fixed to the cylindrical body and a second end that is located on the first flat surface. A spring acts on the pin to hold the shoulder against the rod. An input torque applied to the head causes the threads to move into threads on the second body. When the head engages the first body, further torque results in expansion or elongation of the cylindrical body. The rod freely moves in the longitudinal bore and when a predetermined elongation occurs corresponding to the depth of the shoulder on the pin, the spring moves the pin to align the second flat surface over the rod. With the second flat surface in alignment with the rod, a portion of the pin extends past the head to provide a visual indication that a desired compressive force has been developed between the first and second members.

7 Claims, 1 Drawing Sheet

VISUALLY INDICATED PRELOADED BOLT

This invention relates to a bolt having an indicator to inform a person when a predetermined compressive force is produced between the head of the bolt, a first member and a second member.

It is common practice to join members together through the use of bolts. Torque wrenches are used to apply a predetermined force to the bolts. Unfortunately, should the threads of a bolt become damaged, it is possible to apply the correct torque with a wrench but not achieve a desired compressive force between the members and as a result the members may not be joined together. Recently, the manufacturers of aircraft engines have eliminated torque wrenches as acceptable tools for attaching fuel controls to engines.

Unfortunately, fuel controls are one of the components that are commonly replaced on a regular basis on an aircraft. Such fuel controls are usually connected through an engine mounted adapter through a plurality of bolts. Since all the hydraulic connections for an engine are made through the adapter and a large separation force is created between the adapter and the fuel control. In order to prevent fluid from leaking along the interface between the adapter and fuel control, a uniform preload is required on all of the bolts. In addition, only organizational tools are now approved to remove and replace the fuel controls on the flight line. Thus, obtaining a uniform preload may present a problem.

A possible way of assuring that a uniform preload is applied to all of the bolts is disclosed in U.S. Pat. No. 4,904,132 wherein a force applied through a liquid displaces the liquid which produces a corresponding change in reflected light to provide a visual indication of forces applied to the bolt. Unfortunately, the bolts must be capable of operating in temperature conditions where it may be possible for the fluid to evaporate and as a result the effectiveness of the indicator is diminished or totally ineffective when reused.

I have developed a mechanical indicator for a bolt means to assure that a desired preload is uniformly applied to create a desired compressive force which holds a first member against a second member. The bolt means has a cylindrical body with a threaded portion on a first end and a head on a second end. A flange on the head engages the first member when the threaded portion is mated with corresponding threads in the second member. The cylindrical body has a longitudinal bore that extends to a cross bore in the head. A pin located in the cross bore has a first flat surface separated from a second flat surface by a shoulder having a predetermined depth corresponding to approximately the elongation produced through a stress of 90% of the yield strength of the cylindrical body. A rod located in the longitudinal bore has a first end attached to the threaded end of the cylindrical body and a second end that is located on the first flat surface of the pin. A spring located in the cross bore urges the shoulder of the pin into engagement with the rod. The flange holds the head against the first member while the cylindrical body elongates as input torque is applied to the head to move the threaded portion into corresponding threads in the second member. The rod moves in said longitudinal bore as the cylindrical body elongates to correspondingly move the first end away from the first flat surface and allow the spring to move the second flat surface into alignment with the rod. Movement of the pin exposes a portion of the pin outside of the head to provide a visual indication of the elongation of the cylindrical body which is indicative of a desired compressive force created between the flange and second member for holding the first member in engagement with the second member.

An advantage of this invention resides in structural components that actually respond to elongation of a bolt which is a more accurate measure of preload torque.

It is an object of this invention to provide a bolt means with structural components that provide a visual indication of elongation of a cylindrical body corresponding to a compressive force produced to hold a first member in contact with a second member.

It is another object of this invention to provide a visual indication of a preload on a bolt means which joins a first member to a second member which is reusable.

It is still a further object of this invention to provide a bolt means with an indicator which is activated when a cylindrical member has elongated as a result of a force corresponding to approximately 90% of the yield strength of the cylindrical member has been developed in the cylindrical member.

Figure 2:
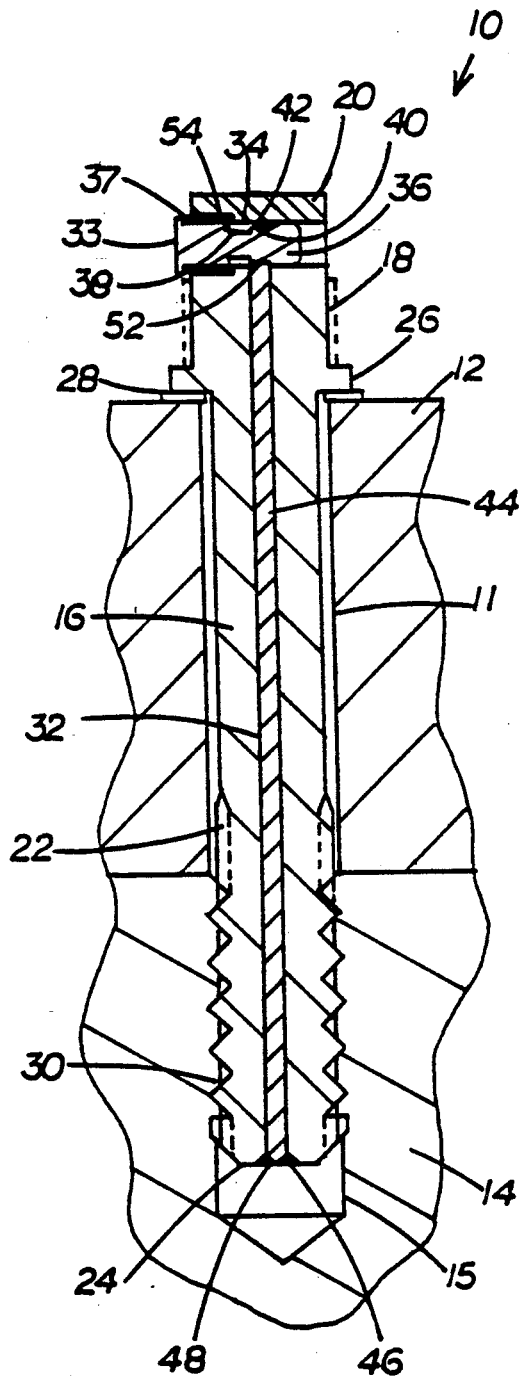

These advantages and objects should be apparent from reading this specification while viewing the drawings wherein:

FIG. 1 is a sectional view of a bolt made according to the principles of this invention for joining a first member to a second member; and FIG. 2 is a sectional view of the bolt of FIG. 1 when torque applied to the head of the bolt has achieved a predetermined preload indicated by elongation of the bolt.

The bolt means 10 shown in FIG. 1 joins a first member 12 to a second member 14. The bolt means 10 has a cylindrical body 16 with a head 18 on a first end 20 and a threaded section 22 and a second end 24. A flange 26 on the head 18 engages the first member 12 through lock washer 28 when the threaded portion 22 is mated with corresponding threads 30 in the second member 14. The cylindrical body 16 has a longitudinal bore 32 that extends to a cross bore 34 in the head 18. A pin 36 which is located in the cross bore 34 has a first flat surface or diameter 38 separated from a second flat surface or diameter 40 by a shoulder 42. The difference between the first diameter 38 and the second diameter and hence the depth of shoulder 42 is based on elastic theory. This theory presupposes that the elastic modulus commonly referred to a Young's Modulus is very nearly constant for a given material, regardless of heat treatment, alloy or bolt size. According to this theory, the strain or elongation of a member such as bolt means 10 in inches per inch, is directly proportional to the applied stress, which is defined as the bolt tension per unit cross-sectional area. High-carbon steel bolts, typically have an ultimate tensile strength of 120,000 psi and when tightened with an input torque of 90% of yield strength, or about 75,000 psi, would elongate about 2.5 thousandths of an inch per inch of a bolt's length, regardless of its diameter. Similarly, alloy steel bolts, which have a higher yield strength would elongate about 3.4 mils per inch when tightened with the same input torque. Consequently, once a manufacturing material has been selected for a bolt, all such bolts of a given grade, when tightened properly, will have nearly identical elongations. Once the length of a bolt is determined, the depth of the shoulder 42 can be defined as a function or percentage of the yield or elongation of the material. Having determined the desired compressive force required to hold the first member 12 against the second member 14, the difference in the dimension between the flats or diameters 38 and 40 or depth of shoulder 42 is defined on pin 36.

A rod 44 located in the longitudinal bore 32 has a first end 46 attached by a laser weld or an epoxy cement 48 to the first end 24 of the cylindrical body 16 and a second end 52 which is located on the first flat surface or diameter 38 of pin 36. A spring 54 located in a stepped portion 37 of the cross bore 34 urges the shoulder 42 on pin 36 into engagement with end 52 of rod 44.

Opening 11 in the first member 12 is aligned with bore 15 in the second member 14 and bolt means 10 is inserted into bore 15. Torque is applied to head 18 by a box end or open ended wrench to screw threads 22 into threads 30. Torque is continuously applied to head 18 and eventually flange 26 engages the first member 12 through lock washer 28. Further torque applied through head 18 causes the cylindrical body 16 to elongate as flange 26 remains stationary and threads 22 continue to move into threads 30. As cylindrical body 16 elongates, end 46 on rod 44 moves in longitudinal bore 32 with the first end 24 of the cylindrical body 16. When sufficient torque has been applied to head 18, end 52 on rod 44 moves out of the first flat surface or diameter 38 to allow spring 54 on pin 36 to move the second flat surface or diameter 40 into alignment with end 52 on rod 44. When spring 54 moves pin 36, end 33 on pin 36 extends past head 18 as shown in FIG. 2 to provide a visual indication that cylindrical body 16 has elongated a predetermined amount. This elongation is indicative of a desired compressive force that has been created between the flange 26 and the second member 14 for holding the first member 12 in engagement with the second member 14.

When it is desired to remove the bolt means 10 from the second member 14, a reset force is applied to compress spring 54 and move pin 36 into bore 34 to again align the first flat surface 38 over end 52 of rod 44. Thereafter, torque is applied to screw threads 22 out of threads 30. With the stress removed from cylindrical body 16, the cylindrical body 16 contacts and end 52 of rod 44 again engages the first flat or diameter 38 of pin 36.

Thus, the above described bolt means 10 can be removed and reused to attach an new member 12' to member 14.

I claim:

1. A bolt means for attaching a first member to a second member, said bolt means comprising:

a cylindrical body with a threaded portion on a first end and a head on a second end, said head having a flange that engages said first member, said cylindrical body having a longitudinal bore that extends to a cross bore in said head;

a pin located in said cross bore having a first surface separated from a second surface by a shoulder;

a rod located in said longitudinal bore having a first end attached to said first end of said cylindrical body and a second end that engages said first surface of said pin; and resilient means located in said cross bore for urging said shoulder on said pin into engagement with said rod, said flange holding said head stationary as the cylindrical body elongates when an input torque is applied to said head to screw said threaded portion into corresponding threads in said second member, said rod moving in said longitudinal bore as the cylindrical body expands to allow said resilient means to move said pin in said cross bore and bring said second surface into alignment over said rod to provide a visual indication of the elongation that has occurred in said cylindrical body, said elongation being indicative of a desired compressive force created between said flange and second member for holding said first member in engagement with said second member.

2. The bolt means as recited in claim 1 wherein said first surface on said pin is a first diameter and said second surface on said pin is a second diameter.

3. The bolt means as recited in claim 2 wherein said cross bore is stepped for retention of said resilient means.

4. The bolt means as recited in claim 3 wherein the depth of said shoulder on said pin is a function of the elongation which occurs at about 90% of the yield strength of the material of the cylindrical body.

5. The bolt means as recited in claim 4 wherein said first end of said rod is connected to said first end of the cylindrical body through a laser weld.

6. The bolt means as recited in claim 5 wherein said pin means has a face which is flush with the head when the rod is positioned on said first surface and extend past the head when said second surface is aligned with said rod.

7. The bolt means as recited in claim 6 wherein the space relationship between said face and head provides a distinct visual indication that the elongation required to produce the desired compressive force has occurred.

* * * * *